No. 851,177. PATENTED APR. 23, 1907.
W. N. LUX & J. C. SCHWENK.
ATTACHMENT TO GRAIN BINDERS.
APPLICATION FILED MAY 1, 1906.

2 SHEETS—SHEET 1.

WITNESSES
Jas. A. Lucas.
N. C. Killen

INVENTORS
William N. Lux
John C. Schwenk
By Wm C. Wilson
their Atty

No. 851,177. PATENTED APR. 23, 1907.
W. N. LUX & J. C. SCHWENK.
ATTACHMENT TO GRAIN BINDERS.
APPLICATION FILED MAY 1, 1906.
2 SHEETS—SHEET 2.
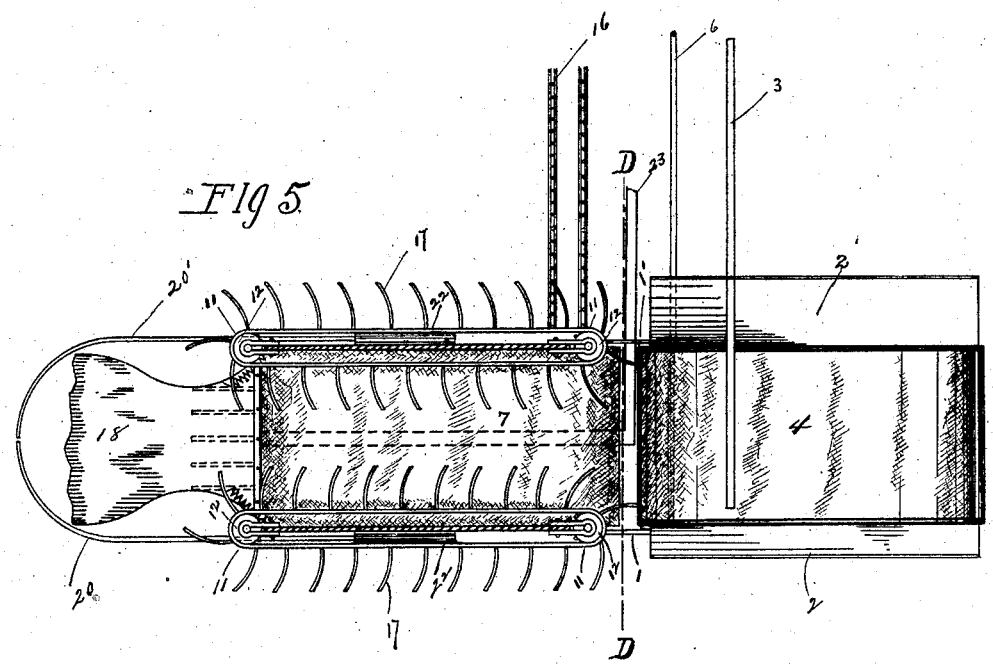
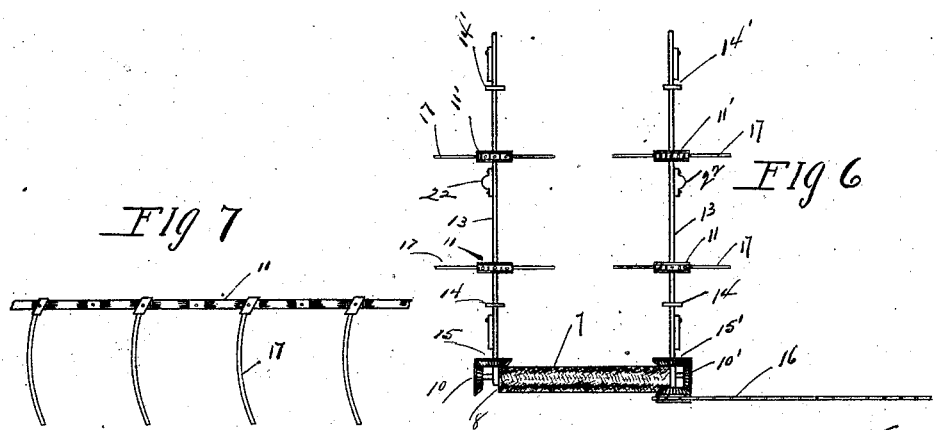
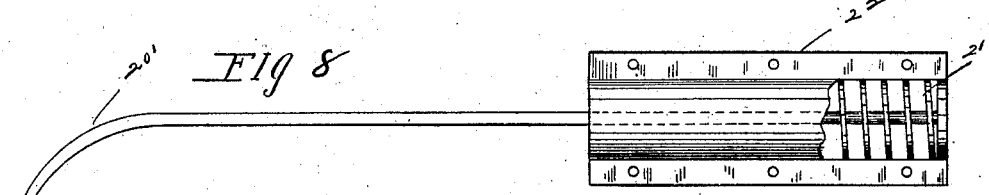
WITNESSES
INVENTORS
William N. Lux
John C. Schwenk.

UNITED STATES PATENT OFFICE.

WILLIAM N. LUX AND JOHN C. SCHWENK, OF ST. LOUIS, MISSOURI.

ATTACHMENT TO GRAIN-BINDERS.

No. 851,177.        Specification of Letters Patent.        Patented April 23, 1907.

Application filed May 1, 1906. Serial No. 314,619.

*To all whom it may concern:*

Be it known that we, WILLIAM N. LUX and JOHN C. SCHWENK, each a citizen of the United States, and residents of the city of St. Louis, and State of Missouri, have invented certain new and useful Improvements in Attachments to Grain-Binders, of which the following is a full, clear, and exact description, reference being had to the accompanying drawings, forming a part hereof.

Our invention relates to improvements in attachments to grain binders, and consists in the novel construction and arrangement of parts more fully set forth in the annexed specification and pointed out in the claims.

Figure 1:
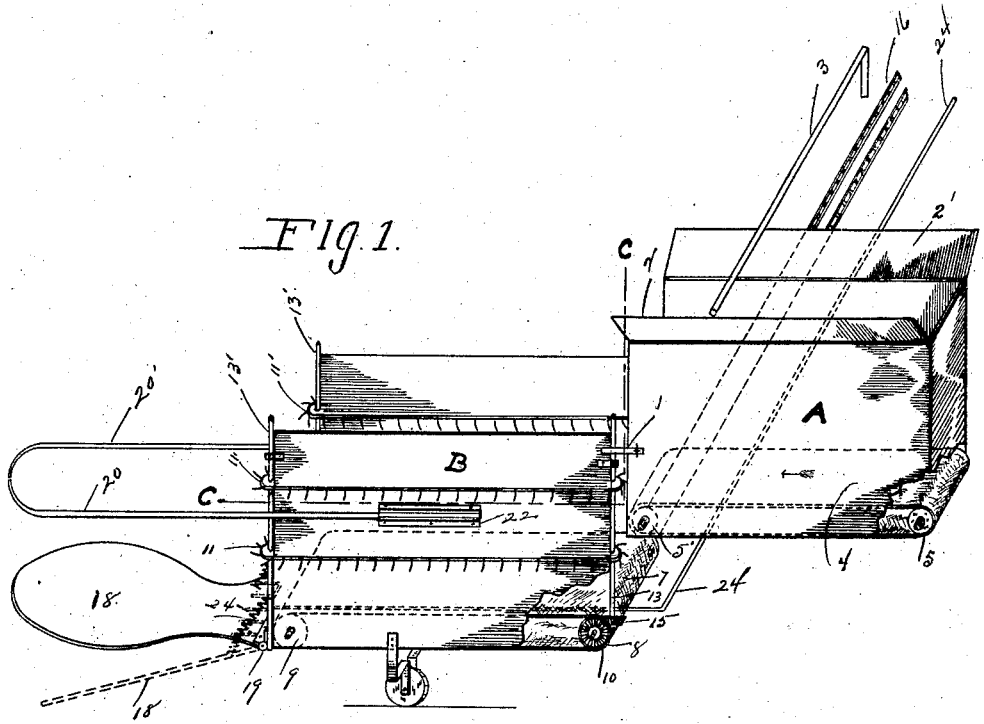
Figure 2:
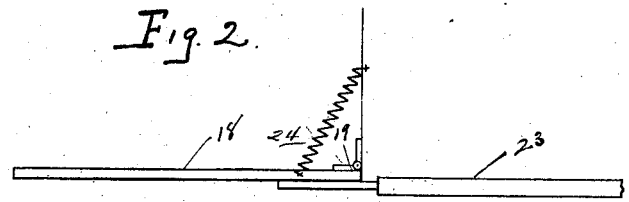
Figure 3:
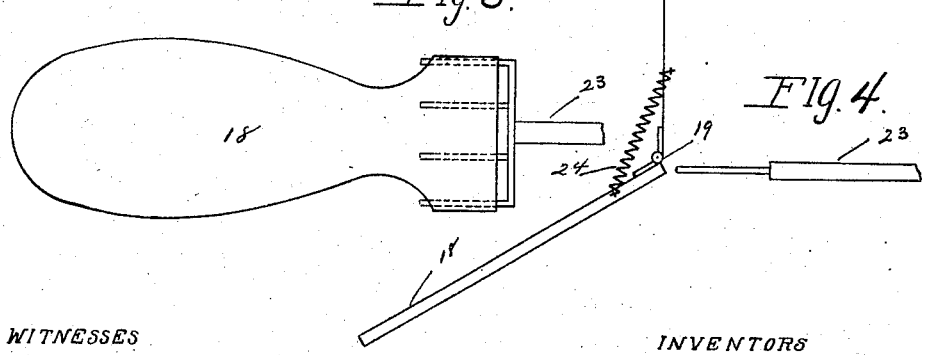
Figure 4:
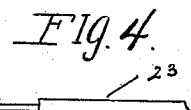

In the drawings Figure 1 is a side elevation of the attachment, with parts of the casing broken away to show the conveyor belt, and rollers, employed in each of the two sections A and B. Figure 2 is a side view of the rear platform, and the supporting arm, showing the platform in a supported position. Figure 3 is a top plan of the same parts. Figure 4 is a side view, similar to Figure 2, except that the supporting arm is released and the platform is in a lowered or dropped position. Figure 5 is a top plan view of the attachment: the rear section B being in cross section on line C—C of Figure 1 to show the link chains or guides mounted on the side walls of the casing. Figure 6 is a front end view of the section B on line D—D of Figure 5. Figure 7 is an enlarged detail of the leaves or fingers of the guiding chains, which are four in number, two mounted on each side wall of the casing as shown in Figure 6. Figure 8 is an enlarged view of the spring releasing arms (the casing being broken away to show the actuating spring) one of said arms being placed on each side of the casing of section B, and extending rearwardly with their hooked portion turned inwardly from a frame above the rear platform of the attachment as shown in Figure 1.

The object of our invention is to provide an attachment to a grain binder, which will receive the sheaves of grain as they are bound from the binder, and to collect or form them into shocks, and to deliver the shocks so formed to the ground in an upright standing position so that without further labor or attention the shocks are left standing in a position most favorable for the proper seasoning or curing of the grain.

Referring to the drawings, A represents the forward section of the attachment which is fixed to the side or platform of the binder; the rear of the casing opening into a second or rear section B which has its casing open at both ends, and connecting the two sections together are the links 1, 1'.

Section A is provided on its top with side fenders 2, 2', and across the top of these said fenders and the platform of the binder rests a guide rod 3, which as the sheaves are received from the binder is designed to tilt them with their heavy or butt end downward to the canvas web or belt 4 which leads over rollers 5, 5' journaled in the casing; the power being supplied by the shaft 6 connecting directly with the binder.

The belt 4 moving in the direction indicated by the arrow conveys the sheaves lengthwise to the entrance of section B.; the said section B being adjusted lower than the section A permits the sheaves to fall upon a secondary web or conveyor 7 in section B. The said conveyor 7 leads over rollers 8 and 9 which are journaled in the casing of section B; the forward roller 8 being provided on each end with a bevel gear 10—10' as will again presently be referred to. At a suitable distance above the said conveyor 7 we provide on each side of the casing, two guide chains 11—11', which turn upon the sprocket wheels 12—12' which are mounted upon the light vertical shafts 13—13' having bearings 14—14' on each end of the casing. At the base end of the two forward shafts 13, are bevel gears 15, 15' which engage with the gears 10, 10' on the previously mentioned forward roller 8 (as shown in Fig. 6); the sprocket chain 16 supplying motion from the binder for the operation of the parts. The guide chains 11, 11' are provided with a series of fingers 17 which as the sheaves of grain tilt downward from the section A to the conveyor 7 in section B, the said fingers 17 are designed to catch and raise the sheaves to an upright position on the conveyor 7 which moving rearward will deliver them to the platform 18 which is hinged at 19 to the bottom rear end of the section B.

The spring arms 20, 20' are each provided with an actuating spring 21 encased within a shield 22 fixed one on each side of the casing; the spring arms extending rearwardly form a frame above the platform 18 and are designed to embrace and hold the sheaves of grain until a sufficient number of sheaves have been gathered upon the platform to form a shock.

The platform 18 is supported by an arm 23 having its supporting end forked; the said arm 23 extends centrally below the section B to a point suitably near the operator, who acting upon the arm withdraws its support from the platform 18 and the shock is lowered or dropped to the ground, as shown in Figure 4. The springs 24 serving to return the platform 18 to its level again as soon as the platform is relieved of the load or shock; the supporting arm 23 is then returned to the support of the platform 18, as shown in Figure 2.

Having described our invention what we claim, and desire to secure by Letters Patent is—

1. An attachment to a grain-binder, comprising a section A fixed to the side of the binder and having an opening through one end, a section B having an opening through one end registering with that of the section A and having an opposite opening through its other end, an endless conveyor-belt arranged horizontally within each of the said sections, the said belts being at different levels and movable longitudinally in the same direction between the ends of the said sections respectively, means for moving the said belts and for guiding the grain sheaves from the binder on to the conveyor belt within the section A., means for engaging the said sheaves in their passage from the section A through the said registering openings, and along the conveyor belt within the section B., and means for delivering the said sheaves in an upright position from the section B through its said opposite opening, substantially as described.

2. An attachment to a grain-binder, comprising a section A fixed to the side of the binder and having an opening through one end, a section B having an opening through one end registering with that of the section A and having an opposite opening through its other end, a suitable platform movably fixed to the outside of the section B at the base of its said opposite opening, an endless conveyor-belt arranged horizontally within each of the said sections, the said belts being at different levels and movable longitudinally in the same direction between the ends of the said sections respectively, means for moving the said belts and for guiding the grain sheaves from the binder on to the conveyor-belt within the section A, means for engaging the said sheaves in their passage from the section A through the said registering openings and along the conveyor-belt within the section B, and for delivering them in an upright position from the section B through its said opposite opening on to the said platform, means for holding the said sheaves in the upright position on the said platform, and means for lowering the said platform for releasing the sheaves therefrom to the ground, substantially as described.

In testimony whereof we affix our signatures in the presence of two witnesses.

WILLIAM N. LUX.
JOHN C. SCHWENK.

Witnesses:
   JAS. A. LUCAS,
   W. C. KINEARS.